US008508726B2

(12) United States Patent
Benner, Jr.

(10) Patent No.: US 8,508,726 B2
(45) Date of Patent: *Aug. 13, 2013

(54) ROTARY POSITION DETECTOR AND ASSOCIATED METHODS

(76) Inventor: William R. Benner, Jr., Longwood, FL (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/103,256

(22) Filed: May 9, 2011

(65) Prior Publication Data

US 2013/0140446 A1 Jun. 6, 2013

Related U.S. Application Data

(63) Continuation-in-part of application No. 12/115,642, filed on May 6, 2008, now Pat. No. 7,940,380, and a continuation-in-part of application No. 12/017,193, filed on Jan. 21, 2008, now Pat. No. 7,688,432.

(60) Provisional application No. 60/886,168, filed on Jan. 23, 2007.

(51) Int. Cl.
*G01B 11/26* (2006.01)

(52) U.S. Cl.
USPC ............................................. 356/138

(58) Field of Classification Search
USPC .............. 356/138, 237.1–237.5, 364, 632
See application file for complete search history.

(56) References Cited

U.S. PATENT DOCUMENTS

| 3,217,170 A | 11/1965 | Ho |
| 3,411,852 A | 11/1968 | Marinozzi, Jr. |
| 3,480,788 A * | 11/1969 | Barbieri et al. ........... 250/237 R |
| 3,780,293 A | 12/1973 | Flint |
| 3,824,878 A | 7/1974 | Grosseau |
| 3,983,391 A | 9/1976 | Clemons |
| 4,056,722 A * | 11/1977 | Ray .......................... 250/231.13 |
| 4,247,769 A | 1/1981 | Warner |
| RE31,062 E | 10/1982 | Burke, Jr. |
| 4,864,295 A * | 9/1989 | Rohr ......................... 340/870.37 |
| 5,225,770 A | 7/1993 | Montagu |
| 5,235,180 A | 8/1993 | Montagu |
| 5,671,043 A | 9/1997 | Ivers |
| 5,844,673 A | 12/1998 | Ivers |
| 6,218,803 B1 | 4/2001 | Montagu et al. |
| 6,921,893 B1 | 7/2005 | Petschik et al. |
| 7,034,282 B2 | 4/2006 | Oka et al. |
| 2008/0013106 A1 | 1/2008 | Sidor et al. |

* cited by examiner

*Primary Examiner* — Tarifur Chowdhury
*Assistant Examiner* — Isiaka Akanbi
(74) *Attorney, Agent, or Firm* — Allen, Dyer, Doppelt, Milbrath & Gilchrist, P.A.

(57) ABSTRACT

A rotary position detector includes a housing having an inner space having a reflective element. A light source emits light rays upwardly. A base supports a light detector assembly having a first number of toroidal-sector-shaped light sensors disposed in pairs about a motor shaft axis, one "A" detector element and one "B" detector element alternately disposed. A light blocker positioned between the light source and the light sensors rotates with the shaft. The light blocker includes a second number of opaque, equal-surface-area elements arrayed about the axis, the second number equal to one-half the first number. A circuit measures a signal from the "A" and "B" detectors relating to an amount of light falling thereon, a difference related to an angular position of the motor shaft.

28 Claims, 7 Drawing Sheets

ROTARY POSITION DETECTOR AND ASSOCIATED METHODS

CROSS-REFERENCE TO RELATED APPLICATION

This application is a continuation-in-part application of application Ser. No. 12/115,642 having filing date of May 6, 2008 and issuing as U.S. Pat. No. 7,940,380, which itself is a continuation-in-part application of application Ser. No. 12/017,193, filed Jan. 21, 2008 and issuing as U.S. Pat. No. 7,688,432, which claimed priority to Provisional Application Ser. No. 60/886,168, filed Jan. 23, 2007, the disclosures of which are herein incorporated by reference and commonly owned.

FIELD OF THE INVENTION

This invention relates to rotary position detectors for indicating the angular position of a shaft or other rotating element. More particularly, this invention relates to such position detectors used on motors and galvanometer-based optical scanners.

DESCRIPTION OF RELATED ART

Rotary position detectors have many uses, such as detecting the position of the shaft on a motor, for the purpose of electrical commutation. Another such use is to detect the position of a tensioner pulley in a magnetic tape player or web-type printing press, for the purpose of maintaining a constant tension on the tape or paper. One of the more recent uses of a rotary position detector is to sense the position of the accelerator (gas) pedal in an automobile that uses electric motors as a partial or complete means of driving the wheels.

Galvanometer-based optical scanners are used to direct non-moving input light beams to a target area. This type of scanner uses a limited-rotation motor to impart rotational motion onto an optical element, such as a mirror. Normally the mirror is mounted directly on the output shaft of the motor. A position detector is included within the motor, either close to the output shaft, or on the "rear" portion of the motor. This position detector normally outputs a current or voltage signal that is proportional to the relative angle of the motor shaft, and thus, relative to the angle of the mirror with respect to the non-moving input light beam.

Galvanometer-based optical scanners direct a laser beam for marking, cutting, or display purposes, for which positioning accuracy and repeatability can be of critical importance. Therefore, one of the limiting factors of accuracy and repeatability is the performance of the position detector used with the optical scanner.

Ideally, a rotary position detector should only be sensitive to the rotational angle of the scanner shaft. Since a mirror is connected directly to the scanner shaft, it is the rotation angle of the shaft that dictates the direction of the exiting light beam. Axial motion and radial motion generally will not affect the target position of the light beam being reflected by the mirror, and since it is the target light beam position that is important to the scanning system, the output of the position detector should indicate the target position, and be insensitive to things that do not affect that target position, such as axial and radial motion. Axial shaft motion may occur as a dynamic behavior of the scanner. For example, if the magnetic construction of the scanner is not perfect, the shaft may surge outward or inward when strong current pulses are put into the scanner during strong acceleration and deceleration. Radial motion of the scanner can occur as a result of bearing "rumble" or imperfections in manufacturing, which allow a small amount of radial motion of the shaft. Radial shaft motion can also occur as a dynamic effect, if the rotor is not perfectly concentric with the stator components, or if the inertial load (mirror and mount) attached to the output shaft is not perfectly balanced.

A servo controller is connected between the position detector and the motor. If the position detector produces some output as a result of axial or radial shaft motion, the servo controller will mistakenly interpret this errant output as a change in rotational position, resulting in a positioning error of the overall system. For that reason, a perfect rotary position detector will produce an output only as the result of rotational motion, and will not produce an output as the result of axial or radial motion.

An additional desirable property of a rotary position detector, especially for galvanometer scanners used with analog servo systems, includes the feature that the output voltage or current be linear with respect to the rotation angle. That is to say, an incremental change in shaft rotation should produce an equally incremental change in output signal from the position detector, although a small degree of nonlinearity is often tolerable. Further, the signal-to-noise ratio should be as high as possible.

There are several ways to sense the position of the shaft within an optical scanner. Two popular types of position detectors comprise capacitive position detectors and optical position detectors.

Capacitive position detectors were used in some of the very earliest galvanometer-based optical scanners. In one known detector, a rotating dielectric butterfly is connected to the scanner shaft, and the detection plates are fixed.

Optical position detectors have emerged recently as the position detector of choice in the field of galvanometer-based optical scanning. Typically, optical position detectors can be made small, and have low inertia, and can be manufactured at low cost. These properties make optical position detectors desirable for optical scanners applied in commercial and consumer markets.

One type of optical position detectors is a "shadow cast" position detector, wherein a large area of light sensor material is attempted to be evenly illuminated, and a shadow is cast on the light sensors by a light blocker. Optical position detectors can use photocells as the light sensors. These photocells are most commonly bulk-area PIN photodiodes, and are used in the "photovoltaic" mode, whereby an electrical current is produced by the photocell, and amplified by an op-amp. The amount of electrical current increases linearly as the intensity of the light over the entire area of the photocell increases linearly. The amount of electrical current also increases linearly as the illuminated portion of the photocell is linearly increased, as long as the illumination across the entire area is constant. That is, if light is illuminating half the light sensor area, and light is blocked from the other half of the light sensor area, the electrical current that is output will be half the amount as of that for a complete illumination of the light sensor, yielding a linear relation of position detector output to photocell area illumination.

Regardless of the type of position detector used, capacitive or optical, all known position detectors are believed to suffer from one common problem: They all output a signal that is indicative of relative shaft rotation, but they do not output a signal that is indicative of absolute shaft rotation. That is to say, it is impossible for the servo controller to read the position signal voltage or current, and know the precise mechanical angle of the shaft, in absolute terms. This is because the output from the photocells or the capacitive plates is proportional to the light produced by the LED or the signal produced by the oscillator, respectively. In the case of the optical position detectors, if the light from the LED increases due to environmental changes, or due to component drift, the output produced by the photocells will increase proportionally. This proportional increase will fool the servo into believing that the shaft has been rotated to a greater mechanical angle. The servo will then try to compensate for this, and generate an error.

All known position detectors attempt to correct for this by using an automatic gain control (AGC) circuit such as known in the art. In the case of the optical position detectors, the light received by all photocells are added together, to form a "total light" signal voltage. This "total light" voltage is compared to a reference voltage, and an error signal is produced that drives the LED. If the "total light" is sensed to have increased, then the light output by the LED is made to decrease by a corresponding amount, thus trying to maintain the sensitivity of the position detector over time. However, the use of AGC is only good enough to correct first-order problems. All known position detectors suffer from position offset drift (a change in what the position detector believes is the "absolute zero" degree position of the shaft) and position scale drift (a change in what the position detector indicates in terms of volts per degree) due to second-order effects, such as drift of the reference voltage itself, or change of the feedback resistors used in the op-amp circuits. These changes occur with time and temperature.

In the past, attempts have been made to provide additional signals to rotational position detectors that are indicative of certain absolute positions. On an elective or automatic basis, the servo can exercise the galvanometer scanner in search of these additional signals, and thus become aware of the absolute position scale and position offset of the position detector. When implemented in a capacitive position detector, this technique has several parasitic problems. First, capacitive position detectors are very sensitive to the shape of the plate members. Plates with protrusions or notches will have an impacted linearity due to fringe effects that happen as a result of the protrusions or notches. Fringe effects will also impact linearity if additional capacitive plates are used. The specially shaped moving butterfly is more expensive to manufacture, whether this technique is used with an optical position detector or with a capacitive position detector. The dominant servo used to control galvanometer-based optical scanners has been the PID servo system made entirely with analog components (analog servos). Analog servo systems have been used because they are relatively inexpensive and relatively simple, and also because up until now, digital servo systems could not achieve the high resolution and high sample rate necessary to be usable with the fastest galvanometer scanners. In order to support the fastest galvanometer scanners currently on the market, and achieve step times in the sub-100-microsecond range, a sample rate of 200 kHz must be used, along with a sampling resolution of 16 bits. And because of the multiple internal calculation steps needed, floating point calculations are highly desirable. Until recently, it was cost-prohibitive to implement a servo controller in a digital form with this high sample rate and resolution. However, with the constant progress that inevitably occurs in technological fields, digital signal processors (DSPs) and analog to digital (ND) converters are now becoming available with sufficient speed and at a reasonable cost, which will help cause a shift from analog servos to DSP-based servos for use with galvanometer scanners.

Analog servos typically have a relatively large number of potentiometers used to "tune" the servo for optimal performance. These potentiometers adjust a number of servo parameters including servo gain, damping, notch filter frequency, notch filter depth, input gain, input offset, etc. There are typically also two additional potentiometers to adjust the position scale and position offset of the position detector. Although these last two are not servo parameters in the strictest sense, they certainly do affect servo performance and accuracy. All these potentiometers must be manually adjusted, or "tuned," by humans. Typically this tuning is done at the factory, but sometimes further tuning is required in the field. Because engineers may not be the end-users of systems with galvanometer scanners, any non-factory tuning can result in sub-optimal operation.

The shift towards DSP-based servo systems will obviate the need for all these adjustment potentiometers, because servo parameters such as servo gain, damping, notch filter frequency, etc. will all be set by algorithmic constants. These algorithmic constants can be manually "tuned" by humans, in a similar way that resulted in the potentiometer adjustments, only using a user interface to make the adjustments, or alternatively these algorithmic constants may be tuned automatically, by some intelligent tuning algorithm. This is possible because almost all the information about the scanning system can be gleaned merely by exercising the scanner and observing what happens with the position signal. For example, the torque constant of the scanner can be derived by observing the back-EMF of the scanner. Stated in mechanical engineering terms KT=KE. That is, dyne centimeters of torque per amp is directly proportional to motor back-emf volts per degree per second. Thus, if the servo creates scanner motion, and can measure the "degrees per second" and the motor back emf, then the servo can derive the precise torque constant (KT) of the scanner.

Once the KT is known, the servo could next apply a pulse of known current for a short time, and measure the angular acceleration that results, and thus the servo can glean the system inertia (J) of the rotor, mirror, and position detector, since force equals mass times acceleration. Therefore, inertia equals KT divided by acceleration.

Next, the servo could wrap a light loop around the scanner and perform a Bode plot, thus revealing all system resonances. With this information, the servo could set all constants for the poles and zeros of notch and bi-quad filters.

Once the torque constant, system inertia, and system resonances are all known, all servo parameters could be easily set in a matter of seconds, with digital precision, achieving the absolute maximum performance from the scanner and servo system. But in order for all this to happen, the servo system needs one fundamental piece of information. The servo must know the "position scale." That is, the servo must first know the volts per degree from the position detector.

As discussed previously, with previously known position detectors, it is impossible for servos to know the position scale with absolute certainty; so it is impossible to make a digital servo that will completely auto-tune. Up until now, scanner manufacturers have side-stepped this problem by putting small memory chips within the scanner. A digital servo could read this memory chip, and this memory chip is pre-programmed at the factory with information including the torque constant, position scale, and position offset, and other information about the scanner. The problem with this approach is that these parameters can change over time. The torque constant of the scanner depends on the magnetism of the rotor (or other scanner components), and this magnetism certainly changes with temperature, and, if the scanner is abused or overheated, can also change with time. Position detector components also change with time due to component drift and also due to temperature and other environmental effects.

Therefore, it would be beneficial to provide a rotary position detector having improved signal-to-noise ratio and also provide absolute position accuracy.

SUMMARY OF THE INVENTION

The current invention is directed to an optical position detector and provides embodiments that include low inertia operation and can be used with small optical scanners. Moreover, embodiments of the invention provide improved signal-to-noise ratio and may optionally provide absolute position accuracy.

A rotary position detector is provided herein that may comprise a housing having an inner space defined by an inner wall. A light source is positioned to emit light rays into the housing's inner space from a bottom thereof. A base is positioned within the housing's inner space;

A light detector assembly is positioned within the housing's inner space and comprises a first number of light sensors positioned on the base and disposed in pairs about an axis of a motor shaft. Each pair comprises one "A" detector element and one "B" detector element. The pairs are disposed so that each "A" detector is circumferentially positioned between two "B" detectors and each "B" detector is positioned between two "A" detectors. The term "light sensor" herein is intended to connote a region of light-sensitive material.

A light blocker is affixed within the housing's inner space for rotation with the motor shaft above the light source, essentially between the light source and the light detector assembly. The light blocker may comprise a second number of opaque, substantially equal-surface-area elements arrayed about the motor shaft axis. The second number is equal to one-half of the first number. Thus the light rays emanating from the light source that not blocked by the light blocker will reach light detector assembly, and light rays that are blocked by the light blocker are not received by the light detector assembly.

A signal connection is provided between the light detector elements and a circuit for measuring a signal from the "A" detectors and the "B" detectors relating to an amount of light falling thereon. A difference between the "A" detector signal and the "B" detector signal is related to an angular position of the motor shaft.

BRIEF DESCRIPTION OF THE DRAWINGS

Features characterizing embodiments of the invention, both as to organization and method of operation, together with further objects and advantages thereof, will be better understood from the following description used in conjunction with the accompanying drawings. It is to be expressly understood that the drawings are for the purpose of illustration and description and are not intended as a definition of the limits of the invention. These and other objects attained, and advantages offered, by the present invention will become more fully apparent as the description that now follows is read in conjunction with the accompanying drawings in which.

DETAILED DESCRIPTION OF EMBODIMENTS

Figure 1:
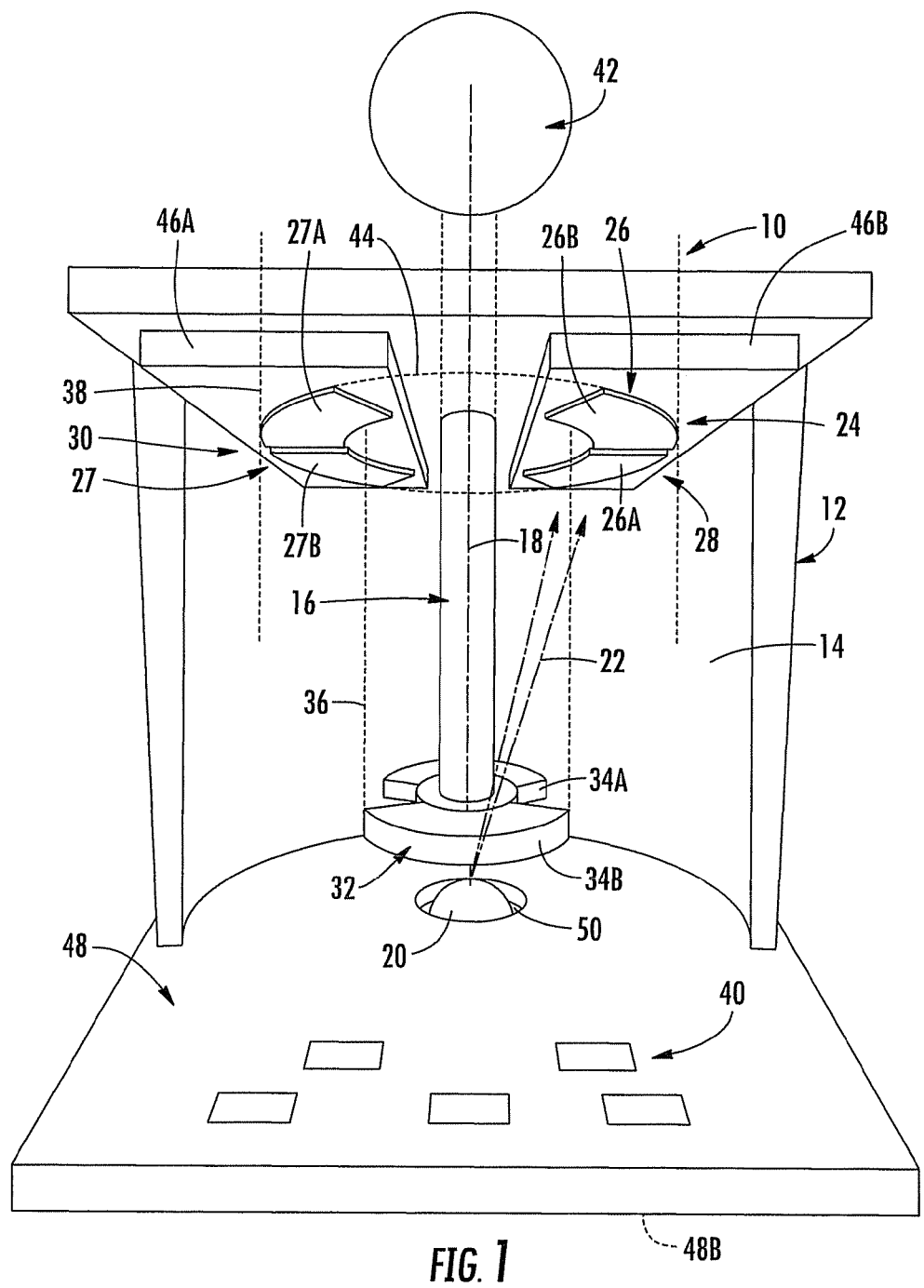
FIG. 1 is a side perspective view of an embodiment of an optical position detector of the current invention, with the housing illustrated in cut-away view.

The present invention will now be described more fully hereinafter with reference to the accompanying drawings, in which embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, or other references mentioned herein are incorporated by reference in their entirety. In case of conflict, the present specification, including any definitions, will control. In addition, the materials, methods, and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description.

The embodiment herein described for an optical position detector according to the teachings of the present invention uses the shadow cast technique. The individual elements of this position detector are improved when compared with other known optical position detectors, yielding improved results from the standpoint of position accuracy and also from the standpoint of signal-to-noise ratio. Moreover, some embodiments of this position detector allow for absolute position determination based on ability for the position detector to indicate when it has reached certain angular conditions.

Embodiments of the invention are herein initially described with reference to FIGS. 1 and 2 for a rotary position detector 10 and an alternate embodiment of the detector 10A, wherein each may be comprises a housing 12 having an inner space 14. A shaft 16, rotatable about an axis 18 extends into the housing inner space 14. A light source 20 is positioned to emit light rays 22 into the housing inner space 14. A light detector 24 is positioned within the housing inner space 14 in a spaced relation to the light source 22. The light detector 24 comprises a first number of segmented light sensors 26, 27 disposed in pairs 28, 30 about the axis 18. Each pair 28, 30 comprises one "A" detector element 26A, 27A and one "B" detector element 26B, 27B, wherein the pairs 28, 30 are disposed so that each "A" detector element is circumferentially positioned between two "B" detectors and each "B" detector element is positioned between two "A" detector elements. A light blocker 32 is positioned between the light detector 24 and the light source 20. The light blocker 32 comprises a second number of opaque, substantially equal-surface-area light blocker elements 34 rotatable with the shaft 16. The second number of light blocker elements 34 is equal to one-half of the first number of light segmented sensors 26, wherein a radial extent 36 of the light blocker elements 34 is less than a radial extent 38 if the light sensors 26, 27. As will be further described later in this section, a signal connection 40 to the light detector 24 is provided for measuring an amount of light impinging on the segmented light sensors 26, 27 to thus measure a rotary position of the shaft 16.

Figure 2:
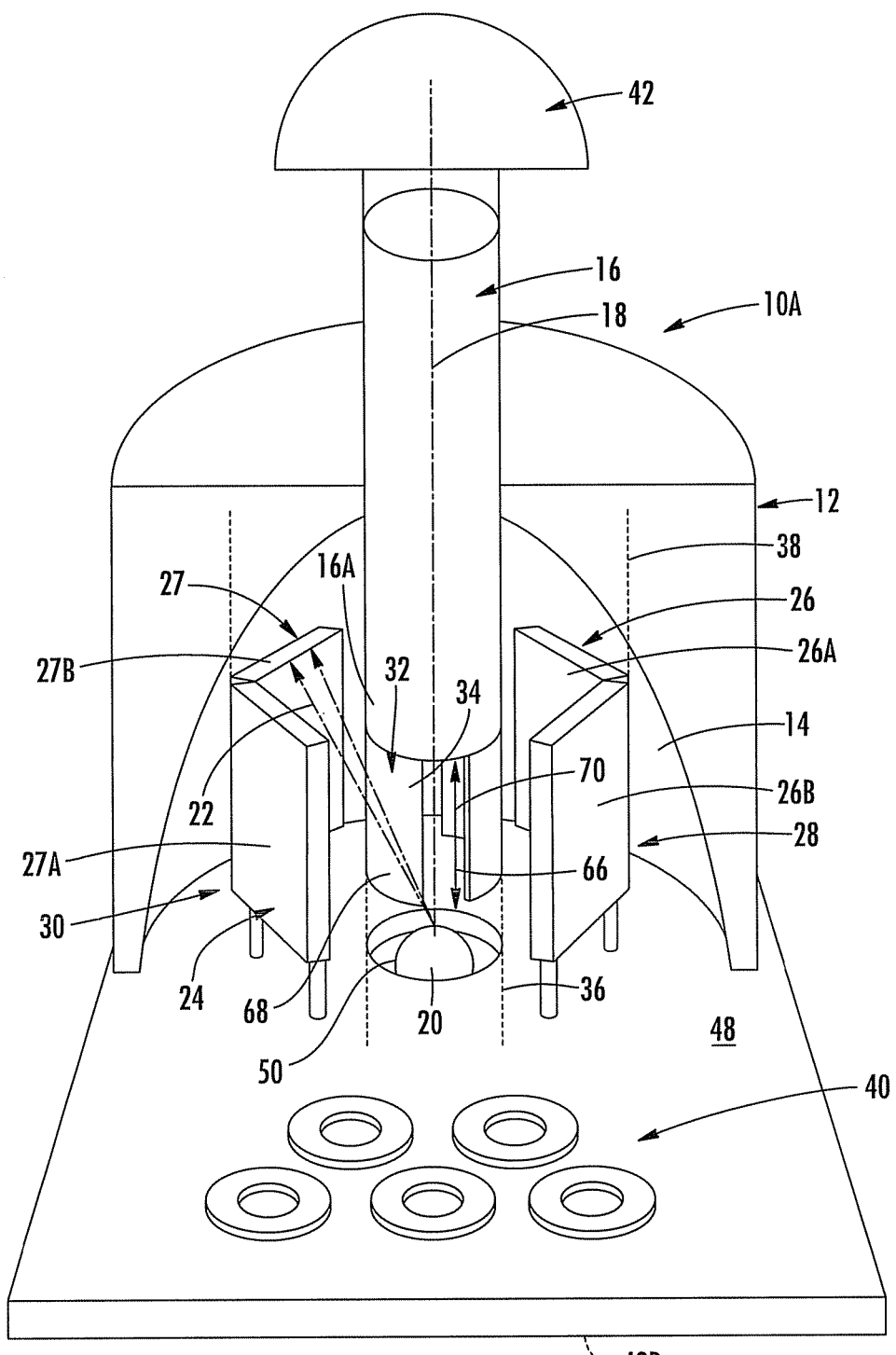
FIG. 2 is a side perspective view of another embodiment of the optical position detector of the current invention wherein the light blocker is formed by a bottom end of the motor shaft, and the light sensors are rectangular, with the housing illustrated in cut-away view.

The embodiment herein described, by way of example, with continued reference to FIGS. 1 and 2, is described in the context of its use within a motor or galvanometer scanner, although this is not intended as a limitation. The housing 12 is adapted to house the sensor components and to absorb unwanted light rays from the environment, and also to connect the shaft 16 directly or indirectly to a motor 42 in a particular embodiment. The housing 12 may comprise, for example, injection-molded plastic or machined metal, although this is not intended as a limitation.

The light source 20 preferably produces a substantially circumferentially uniform field of light, directing the light rays 22 toward the plurality of light sensors 26, 27, which may comprise, for example, toroidal-sector-shaped elements that are arranged within a plane 44 generally perpendicular to the rotating shaft 16, as illustrated with reference to the detector 10 of FIG. 1. The light sensors 26, 27 can be manufactured on light detector chips 46A, 46B, as illustrated with reference to FIG. 1, or may be separated and mounted on a circuit board 48, as illustrated with reference to FIG. 2. The light detector 24 is positioned on the same side of the motor 42 as is the light source 20, but spaced apart from the light source, wherein the light blocker 32 is located between the light source and the light sensor elements 26A, 26B, 27A, 27B.

As herein described by way of example for the detector 10 with reference to FIG. 1, the light blocker 32 comprises the elements 34 formed as generally pie-shaped protrusions 34A, 34B, and periodically interrupts the light rays 22 from reaching certain areas of the light sensor elements 26A, 26B, 27A, 27B, by casting a shadow over the sensors.

The light blocker 12 herein described by way of example is operably connected to the shaft 16. The rotation of the shaft 16, driven by the motor 42, causes the light blocker 32 to rotate. As the illumination areas of some light sensor elements 26A, 26B, 27A, 27B increase (when less of the light sensor area is under a shadow), an output signal from the light sensors also increases. Simultaneously and by the same amount, as the illuminated areas of other light sensor elements 26A, 26B, 27A, 27B decrease (when more of the light sensor area is under a shadow), the output signal from these light sensors decrease.

With continued reference to FIGS. 1 and 2, the light source 20 preferably comprises a unitary LED, mounted on the circuit board 48 or other suitable surface attached to housing 12. For the embodiments herein described, by way of example, the LED is mounted on a bottom side 48B of the circuit board 48, and the light rays 22 emitted from the light source 20 are directed through a hole 50 in circuit board. Such a structure is desirable because any light that is emanating in a sideways fashion will be terminated by walls forming the hole in the circuit board 48 and will not be able to shine indirectly onto the light sensor elements 26A, 26B, 27A, 27B. However, other embodiments are also possible as long as the light source 20 is suitable and located generally along the axis 18 and below the shaft 16, as illustrated with continued reference to FIGS. 1 and 2. The light rays 22 are projected from the light source 20 toward the light sensor elements 26A, 26B, 27A, 27B.

Although the light source 20 has been described as an LED, the light source may also be embodied as a phosphorescent dot, or any other source that produces a suitable cone of light including the light rays 22 in the direction needed. Note that the light source 20 may be provided by a fiber 52, wherein the light source may be located remotely, for example, on a servo driver board, and fed to the detector the optical fiber. This may be preferable in military applications where the detector has to work at higher temperatures, which would be prohibitive for an LED operation. Also, when fed by the fiber, a laser can be used as the light generating means for the light source.

Figure 3:
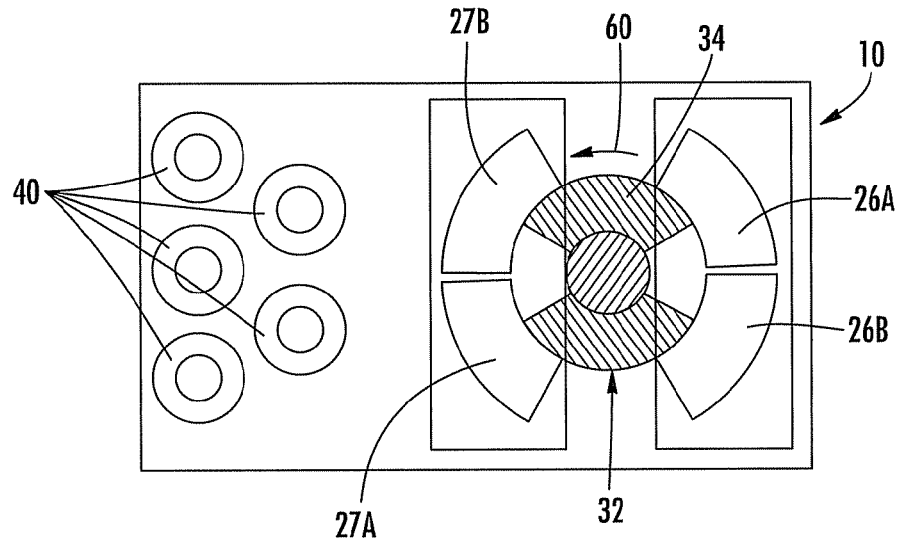
FIG. 3 is a top plan view of one embodiment of the position sensor of the current invention, including the circuit board, toroidal-shaped light sensors, and light blocker, illustrating a light blocker that is much smaller than the outside diameter of the light sensors.

With continued reference to FIG. 1 and now to FIG. 3, there are four light sensor elements 26A, 26B, 27A, 27B as herein described, by way of example, and toroidal-sector-shaped, and as described herein arranged in the pairs 28, 30 about the axis 18. The configuration of the sensor elements 26A, 26B, 27A, 27B essentially dictates a configuration of the light blocker 32 and its elements 34A, 34B. As herein described by way of example, the light blocker 32 comprises two opaque and substantially equal-surface-area elements 34A, 34B, also arrayed about the axis 10. Note that the second number (e.g., two) is equal to one-half of the first number (e.g., four).

Figure 4:
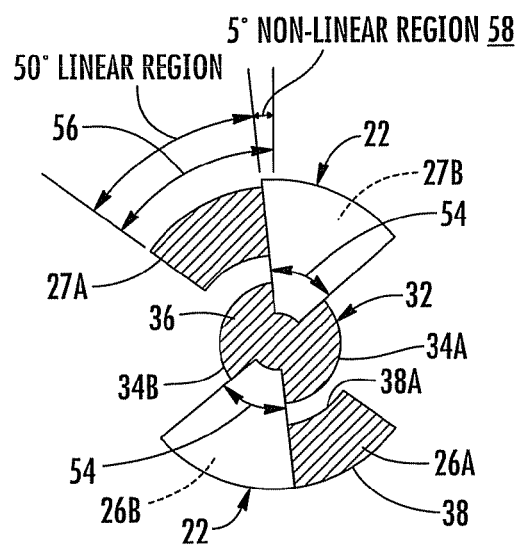
FIG. 4 illustrates in top plan view a relationship between light blocker elements and light sensors, dashed lines showing where individual light sensor elements are located with respect to the light blocker.

As illustrated with reference to FIG. 4, the light blocker 32 is entirely uncovering the "B" pair of toroidal light sensor elements 26B, 27B, but not entirely covering the "A" pair of elements 26A, 27A, as illustrated by the cone of light rays 22. An angular subtense 54 of each of the open areas of the light blocker 32 (here, 60 degrees) may be greater than a first angular subtense 56 (here, 55 degrees) of the light sensor elements 26A, 26B, 27A, 27B by a different second angular subtense 58 (here, 5 degrees). Because of this, further incremental clockwise rotation does not provide any incremental increase in signal output from the "B" pair of light sensors, but does provide an incremental decrease in signal output from the "A" pair. When the angular subtense 54 of openings for the light blocker 32 is greater than that of the light sensor elements 26A, 26B, 27A, 27B, the light detector 24 provides a linear output for an angular change up to the angular subtense of the light sensor elements 26A, 26B, 27A, 27B, and then provides a nonlinear output for an angular change beyond that point.

With continued reference to FIG. 4, and as above described with reference to FIGS. 1 and 2, the radial extent 36 of each of the light blocker elements 34A, 34B is less than the radial extent 38 of an outer edge of the light sensor elements 26A, 26B, 27A, 27B, and may in fact be no greater than the radial extent 38A of an inner edge of the light sensor elements. In some cases the radial extent 36 of the light blocker elements 34A, 34B may be significantly less, depending upon factors including the cone angle of the light source 20 and the distance of the light sensor elements 26A, 26B, 27A, 27B from the light source 20. This is advantageous when compared to prior art sensors whose light blocker radial extent had to be greater than the radial extent of the outer diameter of the light sensor elements 26A, 26B, 27A, 27B. A smaller radial extent reduces inertia substantially, and thus, also increases system performance.

The light blocker 32 can be configured such that when the shaft 16 is rotated in a "positive" direction, as indicated by arrow 85 in FIG. 3 (moving from the configuration shown in FIG. 1 to that shown in FIG. 3), most of the "A" light sensor elements' surface area is illuminated by the light source 20, and most of the "B" light sensor elements' area will be under a shadow. Thus, as the light blocker 32 is rotated, once it fully uncovers the "A" light sensors 26A, 27A, it can actually be rotated further before it fully blocks light from reaching the "B" light sensors 26B, 27B. This allows the servo to detect precisely when the "A" or "B" sensors are fully covered and thus detect precisely the outer angles of the position sensor in absolute terms. However, some applications may not require this absolute position determination, and can use a light blocker whose openings have the same angular subtense as the sensor elements.

Although the figures show four light sensor elements and a light blocker with two protruding elements, it should be understood that as few as four light sensor elements and two light blocker elements, or as many as eight light sensor elements and four light blocker elements, or more, are possible, and still fall within the scope of this invention.

The individual light sensor elements 26A, 26B, 27A, 27B can comprise a light sensor material or device that operates on the principle whereby a linear increase in light per unit area produces a linear increase in output signal. As a non-limiting example, silicon photodiodes, PIN photodiodes, avalanche photodiodes, and cadmium sulfide cells may be used as the light sensor elements in this invention. These are generically referred to as "photocells."

While it is known to arrange individual pairs of light sensor elements 26A, 26B, 27A, 27B on a single "photocell" die or chip 46A, 46B that is rectangular, as shown in FIG. 1, the individual light sensor elements may be assembled in any way as long as the linearity and shape constraints outlined above are met. Further, the light sensor elements 26A, 26B, 27A, 27B may have a greater area than shown, for example, may each comprise a chip of any shape, with a masking element placed thereover to create the sector shape desired to be used.

Figure 5A:
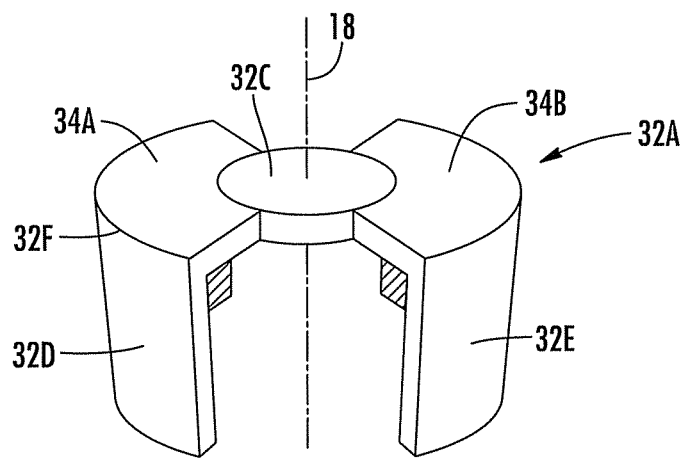
FIGS. 5A and 5B illustrate top/side and bottom perspective views, respectively, of an alternate embodiment of the light blocker that is cup-shaped.
Figure 5B:
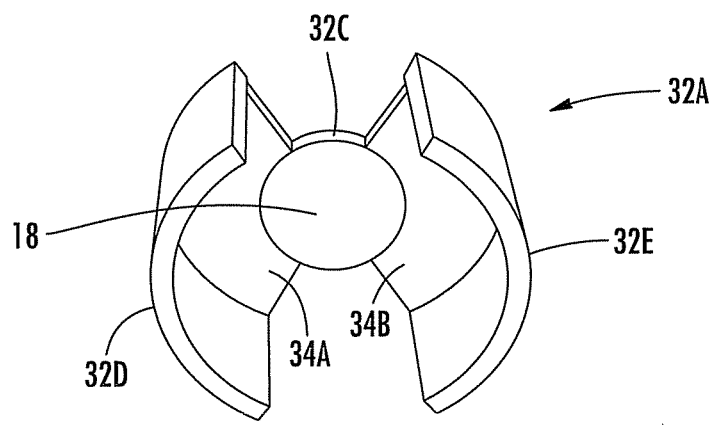

As above described, the light blocker 32 prevents the light rays 22 emanating from the light source 20 from reaching portions of the light sensor elements 26A, 26B, 27A, 27B. The light blocker 32 comprising the pie-shaped elements 34A, 34B is connected directly to the shaft 16, and the shaft is integrally formed with the motor 42, but alternate embodiments including shaft extensions or gear assemblies may be used without departing from the teachings of the present invention. Further, since the light blocker 32 only needs to prevent light from reaching the light sensor elements 26A, 26B, 27A, 27B, it can be made out of a variety of materials. For example, it can be made from ceramic, fiberglass/epoxy, sheet metal, glass, plastic, or any other suitable material that can block light. The light blocker 32 can be made using conventional manufacturing techniques such as injection molding, laser cutting, stamping, photo-etching, or standard machining techniques to conform to the shape herein described by way of example, or made from a transparent disk or transparent tube whereby the blocking function is performed by an opaque material being deposited onto the transparent disk or transparent tube. In addition, other embodiments are also possible, as herein illustrated by way of example with reference to FIGS. 5A and 5B for an alternate embodiment 32A of the light blocker 32 in which cup-shaped and herein described as including the blocker elements 34A, 34B, described earlier with reference to FIG. 1, for the light blocker 32 as two substantially pie-shaped elements, and here described as arrayed about a central disk 32C. Downwardly depending from the blocker elements 34A, 34B are side walls 32D, 32E forming a partially enclosed cylinder having a top edge 33F coextensive with an outer edge of the top blocker elements 34A, 34B.

Figure 6:
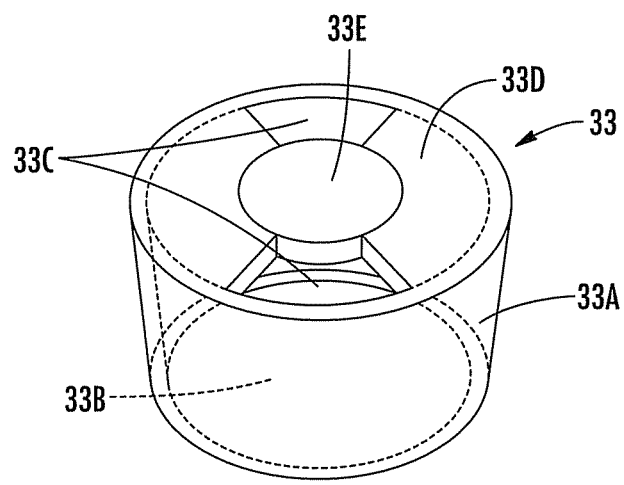
FIG. 6 illustrates a top/side perspective view of another embodiment of a light blocker that has a cutaway top face.

As illustrated with reference to FIG. 6, a further embodiment of a light blocker 33 comprises a substantially cylindrical wall 33A an interior space 33B defined by the wall positioned to receive the light rays from the light source. The cylindrical shaped light blocker 33 includes a pair of opposed, substantially equal-area openings 33C through a top face 33D thereof and diametrically opposed about a central disk 33E. The openings 33C admit the light rays therethrough for reaching the light sensor elements.

Figure 7:
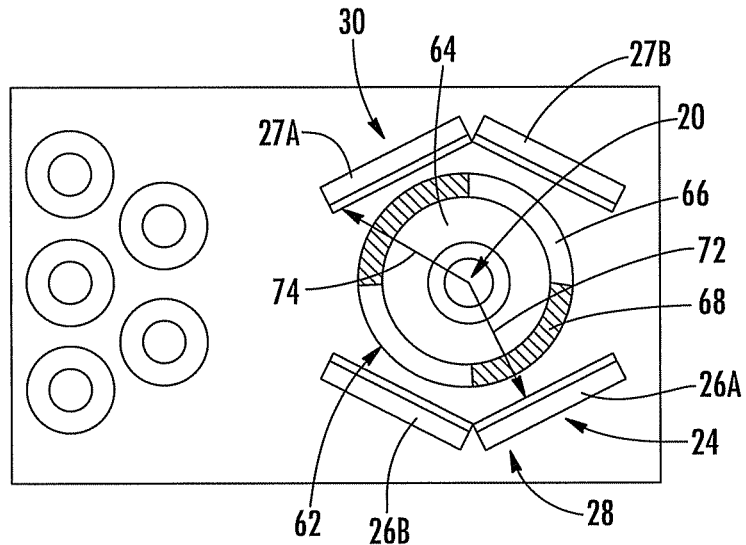
FIGS. 7 and 7A are partial top plan and perspective views, respectively, of a circuit board and rectangular light sensors of another embodiment of the current invention.
Figure 7A:
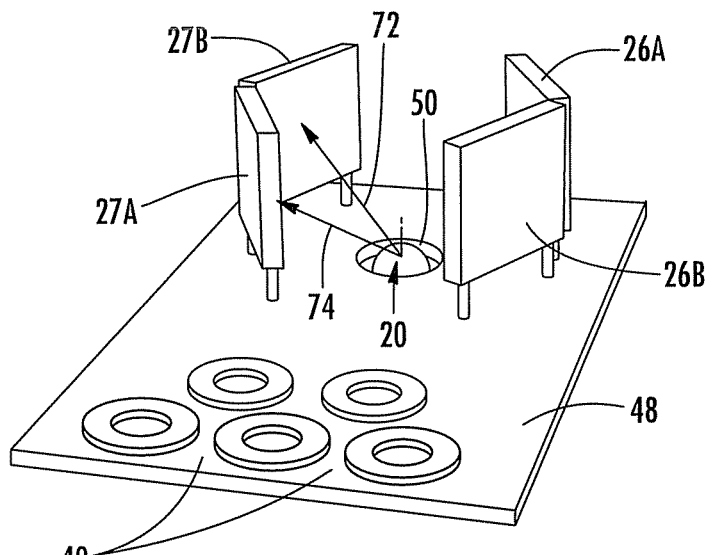

With reference again to FIG. 2, and now to FIGS. 7 and 7A, the detector 10A is also herein described in the context of its use within a motor or galvanometer scanner, although this is not intended as a limitation. In the position detector 10A, the light detector 24, as above described, includes rectangular light sensor elements 26A, 26B, 27A, 27B that are arranged generally parallel to the axis 18 and thus rotating shaft 16. The light sensor elements 26A, 26B, 27A, 27B are mounted on the circuit board 48 and on the same side of the motor 42 as is the light source 20. The light blocker 32 is integrally formed with a bottom portion 16A of the shaft 16. The bottom portion 16A comprises a generally cylindrical portion 62 having an interior space 64 that is positioned to receive the light rays from the light source 20. The cylindrical portion 62 formed as an extension of the shaft 16 has two opposed, equal-sized openings 66, or "windows," extending therethrough, for example, in this embodiment, from a bottom edge thereof, although this is not intended as a limitation. The openings 66 define sections 68 of the cylindrical portion 62 that serve as the light blocker elements. Again, the word "pair" is not intended as a limitation, and the number may comprise up to 8, or even more, in some applications. For the embodiment of the detector 10A, illustrated herein by way of example, each opening 66 has a height dimension 70, illustrated with reference again to FIG. 2, sufficient to admit the light rays therethrough for reaching the light sensor elements 26A, 26B, 27A, 27B.

Note that although the light blocker herein described with reference to FIG. 2 includes the bottom portion of the shaft, other light blockers may be used such as those described above with reference to FIGS. 5A and 6. The light blocker may also be formed from a transparent tube or light guide with transparent and opaque areas performing the function of the openings 66 as the "windows."

With continued reference to FIGS. 2 and 7, since the light sensor elements 26A, 26B, 27A, 27B are rectangular instead of circular, the distance 72 that the light rays 22 must travel to the center of a light sensor element, is different from the distance 74 that the light rays must travel to the edge of a light sensor element. This causes an error in the output signal, the error being proportional to the tangent of the shaft rotation. However, for the range of angles used with galvanometer-based optical scanners, this error is easily tolerated, and generally corrected externally within the servo system or computer software that drives the servo system.

Embodiments of the light blocker described above improve the shadow that is cast on the respective light sensor elements, particularly if the light source is not a point source. Further, it is not strictly necessary for the alternative light blocker embodiments to have rectangular features. The cup may be made with cone-like features, which may provide easier manufacturing of the light blocker or better light blockage. Moreover, the light blocker itself may be embodied as blades or even splines that are machined directly onto a motor shaft itself to perform the light blocking function.

Figure 8:
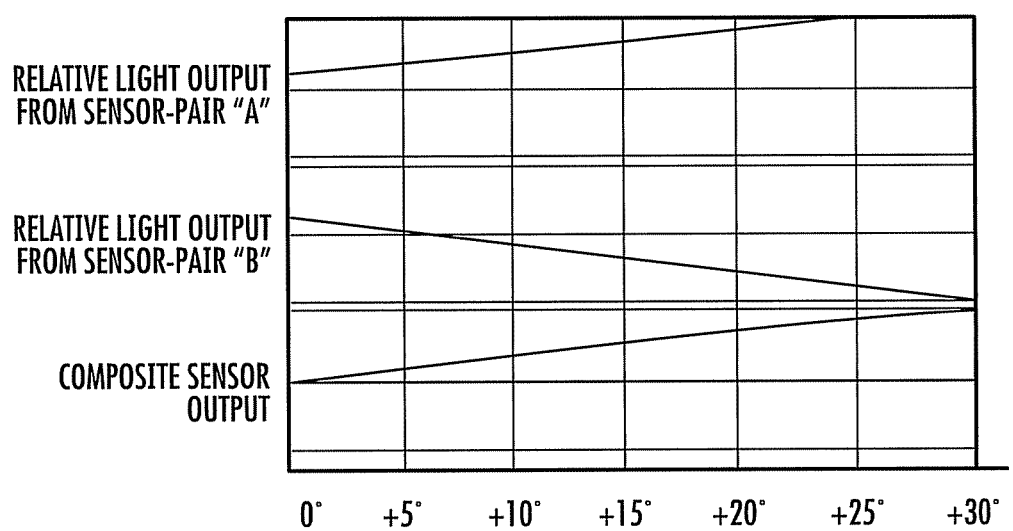
FIG. 8 is a plot of the output signal from the "A" and "B" pairs of light sensors, along with the composite "A minus B" output, wherein it is illustrated that the composite output is linear until either the "A" pair or "B" pair of light sensors is entirely uncovered; after that, the position detector still provides output, but at a reduced rate of change.

Unlike previously known rotary position sensors, the openings of the light blocker may have a different angular subtense than the individual light sensor elements. When this is done, there are several advantages. One advantage is that, since the angular subtense of the light blocker openings is larger than the angular subtense of the light sensors, when rotated in the "positive" direction, as above described with reference to FIGS. 1 and 3, for the embodiment of FIG. 2, the "A" light sensors become fully un-blocked before the "B" light sensors are fully blocked. Further "positive" rotation still produces a detectable output from the "B" sensors, but does not produce an output from the "A" sensors. Thus this condition of further change from one output with no further change from the other may be used to precisely determine the shaft angle in absolute terms. Another advantage is that if the A and B outputs are subtracted, as is the typical method for this type of sensor, there is a "linear" portion of shaft rotation angle to output signal correspondence, and, at the edges, there is a "nonlinear" portion of shaft angle to output signal correspondence. As illustrated by way of example with reference to the plot of FIG. 8, the rate of change of sensor output is shown to change above 25 degrees.

Preferably, in general, light blocker openings have an angular subtense at least as great as than the light sensors' angular subtense. However, one of skill in the art will appreciate that the angular subtense could be substantially the same as, or even less than, that of the light sensors without departing from the spirit of the invention. In some embodiments, the angular subtense of light blocker openings can be made larger or smaller than that of the light sensor elements, and by any desirable amount that satisfies the engineering needs of the system. However, for optical scanning applications, the difference in subtense can typically reside in a range of 2-10 degrees.

The number of light blocker openings can comprise as few as 2, and as many as 8 or more, as long as there are two light sensors ("A" and "B") per light blocker opening, with a greater number of light blocker openings reducing the angle of operation of the position detector. The maximum angle (in degrees) over which this position detector can output a single ramp signal from the "main" outputs is equivalent to 360 divided by the number of blades minus the (blade angle of subtense minus the light sensor angle of subtense).

Figure 9:
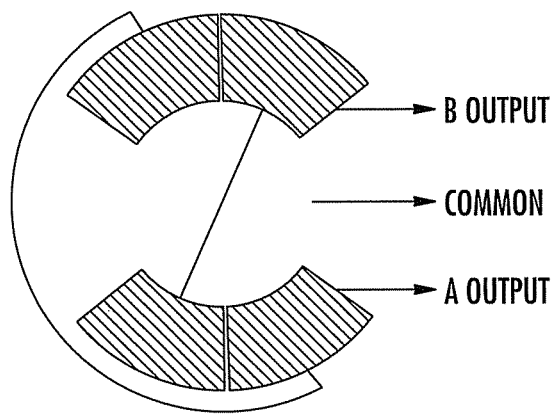
FIG. 9 illustrates an embodiment of light sensor element connectivity to provide output signals, wherein diametrically opposed light sensor elements are connected, and only two outputs are provided.

With reference now to FIG. 9, individual light sensor elements may be connected in parallel, so that a minimum of wires are sent to the servo controller. A benefit of this connection scheme is that it reduces the number of wires that are needed to be connected from the position detector to the servo system. However, a common drawback with prior art position sensors is that, if the individual light sensor elements that are connected in parallel do not produce exactly the same amount of output signal as other individual light sensor elements for a given amount of light, then insensitivity to radial and axial motion is not optimal.

Figure 10:
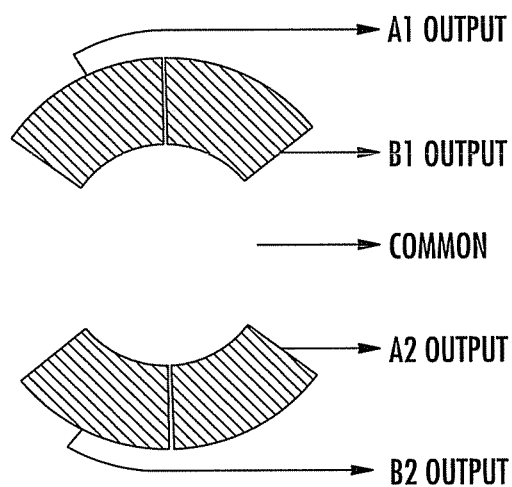
FIG. 10 illustrates another embodiment of light sensor element connectivity to provide output signals, wherein the output of each light sensor element is used directly with no connection made to other light sensor elements.

As an alternative connection scheme, the output from individual light sensor elements can be used individually, as illustrated with reference to FIG. 10. An advantage of this arrangement is that the servo can characterize the output from each light sensor and then algorithmically increase linearity and radial insensitivity. In these embodiments, the connections to the outputs are made via pads of the signal connection 40 on the circuit board 48.

The position detector of the present invention is particularly useful when connected to a digital servo system, which can exercise the scanner and easily locate the point in the shaft rotation at which the "A" and "B" light sensors are completely blocked, and thus determine the extent of angular excursion in absolute terms. Because of this, an AGC system may not be needed, and the light source can be operated at maximum output all the time, thus maximizing signal-to-noise ratio.

In the drawings and specification, there have been disclosed typical preferred embodiments of the invention, and although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

What is claimed is:

1. A rotary position detector comprising:
 a housing having an inner space;
 a shaft extending into the housing inner space, the shaft rotatable about an axis thereof;
 a light source positioned to emit light rays into the housing inner space;
 a light detector positioned within the housing inner space in a spaced relation to the light source, the light detector comprising a first number of segmented light sensors disposed in pairs about the axis, each pair comprising one "A" detector element and one "B" detector element, the pairs disposed so that each "A" detector element is circumferentially positioned between two "B" detector elements and each "B" detector element is positioned between two "A" detector elements;
 a light blocker positioned between the light detector and the light source, the light blocker comprising a second number of opaque, substantially equal-surface-area elements rotatable with the shaft, the second number equal to one-half of the first number, wherein a radial extent of the light blocker elements is less than a radial extent if the light sensors; and
 a signal connection to the light detector for measuring an amount of light impinging on the segmented light sensors to thus measure a rotary position of the shaft.

2. The rotary position detector according to claim 1, further comprising a circuit operable with the signal connection for measuring signals from the "A" detectors and the "B" detectors relating to an amount of light impinging thereon, wherein a difference between the "A" detector signal and the "B" detector signal is related to an angular position of the shaft.

3. The rotary position detector according to claim 1, wherein the segmented light sensors are generally defined within a plane perpendicular to the axis.

4. The rotary position detector according to claim 3, wherein each of the segmented light sensors comprises an arcuate sector shape.

5. The rotary position detector according to claim 4, wherein the arcuate shape comprises a substantially toroidal shape.

6. The rotary position detector according to claim 1, wherein the segmented light sensors are generally defined within a plane parallel to the axis.

7. The rotary position detector according to claim 6, wherein the light sensors have a rectangular surface receiving the light.

8. The rotary position detector according to claim 1, wherein the radial extent of the light blocker elements is substantially less than the radial extent of the light sensors.

9. The rotary position detector according to claim 8, wherein the light blocker elements radial extent is no greater than a radial extent of an inner edge of the light sensors.

10. The rotary position detector according to claim 1, wherein the light blocker has a plurality of openings, each opening between adjacent light blocker elements, and wherein the angular subtense of each of the light blocker openings is at least as great as the angular subtense of the light sensors.

11. The rotary position detector according to claim 1, wherein the light source comprises a unitary light source generally aligned with the axis.

12. The rotary position detector according to claim 1, wherein the first number of segmented light sensors comprises four light sensors.

13. The rotary position detector according to claim 1, wherein the light sensors comprise a light sensor material responsive to light, and wherein a linear increase in light per unit area impinging thereon causes a substantially linear increase in output signal.

14. The rotary position detector according to claim 1, wherein the light blocker elements comprise blades.

15. The rotary position detector according to claim 1, wherein the light blocker comprises a substantially transparent tube having imposed thereon the opaque elements.

16. The rotary position detector according to claim 1, wherein each of the light blocker elements further comprises a side wall extending therefrom toward the light source to form a light blocker that is substantially cup-shaped.

17. The rotary position detector according to claim 1, wherein the light blocker comprises a substantially cylindrical element having an interior space defined by a side wall and positioned to receive the light rays from the light source, the cylindrical element having a pair of spaced-apart, substantially equal-area openings through a top face thereof for admitting light rays therethrough.

18. The rotary position detector according to claim 17, wherein the openings have an angular subtense at least as great as an the light sensor angular subtense of the light sensor.

19. The method according to claim 18, wherein a radial extent of the light blocker elements is substantially less than a radial extent of the light sensors.

20. The method according to claim 18, wherein the light blocker elements radial extent is no greater than a radial extent of an inner edge of the light sensors.

21. The method according to claim 18, wherein the light transmitting comprises shining light from a unitary light source generally aligned with the axis of the shaft.

22. The method according to claim 18, wherein the first number of segmented light sensors comprises four light sensors.

23. The method according to claim 18, wherein the light sensors comprise a light sensor material responsive to light, and wherein a linear increase in light per unit area impinging thereon causes a substantially linear increase in output signal.

24. The method according to claim 18, wherein the light blocker elements comprise blades.

25. The method according to claim 18, wherein the light blocker comprises a substantially transparent tube having the opaque elements imposed thereon.

26. The rotary position detector according to claim 1, wherein the light blocker comprises a bottom portion of the motor shaft, the bottom portion comprising a generally cylindrical portion having an interior space positioned to receive the light rays from the light source, the light blocker elements comprising segments of the cylindrical portion separated by spaced-apart openings extending from a bottom edge thereof.

27. The rotary position detector according to claim 1, further comprising a motor, wherein the motor is operable with the shaft.

28. A method of detecting a rotary position of a shaft comprising, the method comprising:
transmitting light into an inner space of a housing having a shaft extending therethrough and rotatable about an axis thereof;
detecting at least some of the light with a light detector positioned within the housing inner space, wherein the light detector comprises a first number of segmented light sensors disposed in pairs about the axis of the shaft, each pair comprising one "A" detector element and one "B" detector element, the pairs disposed so that each "A" detector is circumferentially positioned between two "B" detectors and each "B" detector is positioned between two "A" detectors;
blocking a portion of the light with a light blocker positioned within the housing inner space and rotatable with the shaft, the light blocker comprising a second number of opaque, substantially equal-surface-area elements arrayed about the axis, the second number equal to one-half of the first number, the blocked light portion thereby unable to reach the light sensors, wherein an outer extent of the light blocker is no greater than an outer extent of the light sensors; and
processing a signal received from the "A" detectors and the "B" detectors relating to an amount of light impinging thereon, wherein a difference between the "A" detector signal and the "B" detector signal is related to a rotary position of the shaft.

* * * * *